Patented Jan. 22, 1946

2,393,247

UNITED STATES PATENT OFFICE 2,393,247

PROCESS FOR THE PREPARATION OF THIONYL CHLORIDE

Alban Thomas Hallowell and Gordon Theodore Vaala, Wilmington, Del., assignors to E. I. du Pont de Nemours & Company, Wilmington, Del., a corporation of Delaware No Drawing. Application February 3, 1945, Serial No. 576,148

15 Claims. (Cl. 23—203)

This invention relates to the manufacture of thionyl chloride.

This application is a continuation-in-part of our copending application Serial No. 539,378, filed June 8, 1944.

Thionyl chloride is an important material in the manufacture of many chemicals and chemical intermediates, such as dyestuffs, pharmaceuticals and acid chlorides. It is ordinarily prepared by the reaction of sulfur trioxide with sulfur chlorides and has also been prepared by the reaction of sulfur dioxide with chlorides of phosphorus. These materials are of such a nature that the manufacture is fraught with special problems.

This invention has as an object the provision of a process for the manufacture of thionyl chloride. A further object is a process using readily available, less corrosive materials. Other objects will appear hereinafter.

These objects are accomplished by the following invention wherein sulfur dioxide is reacted with a chlorinated methane having three or four chlorines, the other valences of the carbon being satisfied by hydrogen, e. g., chloroform or carbon tetrachloride, at a temperature of 100° to 300° C. and at a pressure of one to five hundred atmospheres in the presence of a Friedel-Crafts' catalyst, preferably a polyvalent metal halide hydrolyzing in water to an acid reaction.

In the preferred practice of the invention, the reaction is run at 140° to 200° C. for two to eight hours in the presence of 0.01 to 1.0 mole of aluminum chloride per mole of carbon tetrachloride or chloroform and at a pressure of 15 to 200 atmospheres. The use of longer reaction times, higher pressures or larger amounts of catalyst is not excluded. The reaction can be carried out in the liquid phase or gas phase provided suitable contact with the catalyst is maintained. In the carbon tetrachloride-sulfur dioxide reaction, it is desirable, but not necessary, to employ two moles or more of sulfur dioxide per mole of carbon tetrachloride. If the amount of sulfur dioxide is less than two moles per mole of carbon tetrachloride, the yield of thionyl chloride is lowered and an undesirable amount of phosgene is formed. In the chloroform-sulfur dioxide reaction, one mole of sulfur dioxide per mole of chloroform gives good results. The reactions are thought to be as follows:

(1)     $CCl_4 + 2SO_2 \rightarrow 2SOCl_2 + CO_2$
(2)     $CHCl_3 + SO_2 \rightarrow SOCl_2 + HCl + CO$ Typical Friedel-Crafts' catalysts include aluminum chloride, aluminum bromide, ferric chloride, boron trifluoride, stannic chloride, titanium tetrachloride, antimony pentachloride, zinc chloride, and complexes of Friedel-Crafts' catalysts with organic compounds.

The more detailed practice of the invention is illustrated by the following examples, wherein parts given are by weight. There are, of course, many forms of the invention other than these specific embodiments.

Example I

Carbon tetrachloride (180 parts), sulfur dioxide (100 parts), and aluminum chloride (65 parts) were heated at 140° C. for six hours in a stainless steel-lined autoclave. The autogenous pressure developed was 32 atmospheres. After bleeding the autoclave to atmospheric pressure, 256 parts of a dark liquid was obtained. Distillation of the liquid at room temperature and 40 mm. pressure, followed by fractionation of the distillate at atmospheric pressure, yielded 100 parts of thionyl chloride boiling at 75° to 77° C. A small amount of phosgene was found in the low boiling fractions. The thionyl chloride was characterized by its boiling point (reported 78.8° C.), neutral equivalent of 31 (theory 30), and conversion to dimethyl sulfite boiling at 124° C. and having a saponification equivalent of 57 (corresponding values for dimethyl sulfite of known origin being 126° C. and 55, respectively). The phosgene was reacted with aniline to yield a derivative melting at 238° to 240° C. and showing no depression in a mixed melting point with carbanilide.

Example II

Carbon tetrachloride (180 parts), sulfur dioxide (160 parts), and aluminum chloride (20 parts) were heated in a stainless steel-lined autoclave at 150° C. for eight hours. The pressure produced was 40 atmospheres. A small amount of crude phosgene was condensed in dry ice-acetone cooled traps during bleeding of the autoclave. A dark liquid product (260 parts) was removed from the autoclave and distilled as described in Example I, yielding 140 parts of thionyl chloride.

Example III

Carbon tetrachloride (90 parts), sulfur dioxide (100 parts), and aluminum chloride (10 parts) were heated in a stainless steel-lined autoclave at 200° C. for eight hours. A dark liquid was obtained from the autoclave and was distilled as described in Example I yielding 100 parts thionyl chloride.

Example IV

Carbon tetrachloride (80 parts), sulfur dioxide (90 parts), and ferric chloride (30 parts) were heated in a stainless steel-lined autoclave at 200° C. for twelve hours. A dark liquid product was removed from the autoclave and distilled as described in Example I yielding 85 parts thionyl chloride.

Example V

Chloroform (80 parts), sulfur dioxide (100 parts) and aluminum chloride (20 parts) were heated in a stainless steel-lined autoclave at 150° C. for eight hours. After bleeding the autoclave to atmospheric pressure, 95 parts of a liquid product was obtained. The product was distilled as in Example I and 32 parts of thionyl chloride, boiling at 75° to 76° C. and having a neutral equivalent of 33, was obtained.

When the reaction conditions found suitable for the preparation of thionyl chloride from sulfur dioxide and chloroform or carbon tetrachloride were applied to sulfur dioxide and methylene dichloride, no thionyl chloride was obtained.

The above description and examples are intended to be illustrative only. Any modification thereof or variation therefrom which conforms to the spirit of the invention is intended to be included within the scope of the claims.

What is claimed:

1. Process for the preparation of thionyl chloride which comprises reacting sulfur dioxide and carbon tetrachloride in the presence of a Friedel-Crafts' catalyst and recovering the thionyl chloride.

2. Process for the preparation of thionyl chloride which comprises reacting sulfur dioxide and carbon tetrachloride at 100° to 300° C. and at a pressure of one to five hundred atmospheres in the presence of a Friedel-Crafts' catalyst and recovering the thionyl chloride.

3. Process for the preparation of thionyl chloride which comprises reacting sulfur dioxide and carbon tetrachloride at 100° to 300° C. and at a pressure of one to five hundred atmospheres in the presence of a Friedel-Crafts' metal halide catalyst and recovering the thionyl chloride.

4. Process for the preparation of thionyl chloride which comprises reacting sulfur dioxide and carbon tetrachloride at a temperature of 140° to 200° C. and a pressure of fifteen to two hundred atmospheres in the presence of a Friedel-Crafts' metal halide catalyst and recovering the thionyl chloride.

5. Process for the preparation of thionyl chloride which comprises reacting carbon tetrachloride with at least two moles, per mole of carbon tetrachloride, of sulfur dioxide at 140° to 200° C. in the liquid phase and at a pressure of fifteen to two hundred atmospheres in the presence of aluminum chloride as a catalyst and recovering the thionyl chloride.

6. Process according to claim 5 wherein the aluminum chloride is used in the amount of 0.01 to 1.0 mole per mole of carbon tetrachloride.

7. Process for the preparation of thionyl chloride which comprises reacting sulfur dioxide and chloroform in the presence of a Friedel-Crafts' catalyst and recovering the thionyl chloride.

8. Process for the preparation of thionyl chloride which comprises reacting sulfur dioxide and chloroform at 100° to 300° C. and at a pressure of one to five hundred atmospheres in the presence of a Friedel-Crafts' catalyst and recovering the thionyl chloride.

9. Process for the preparation of thionyl chloride which comprises reacting sulfur dioxide and chloroform at 100° to 300° C. and at a pressure of one to five hundred atmospheres in the presence of a Friedel-Crafts' metal halide catalyst and recovering the thionyl chloride.

10. Process for the preparation of thionyl chloride which comprises reacting sulfur dioxide and chloroform at a temperature of 140° to 200° C. and a pressure of fifteen to two hundred atmospheres in the presence of a Friedel-Crafts' metal halide catalyst and recovering the thionyl chloride.

11. Process for the preparation of thionyl chloride which comprises reacting chloroform with at least one mole, per mole of chloroform, of sulfur dioxide at 140° to 200° C. in the liquid phase and at a pressure of fifteen to two hundred atmospheres in the presence of aluminum chloride as a catalyst and recovering the thionyl chloride.

12. Process according to claim 11 wherein the aluminum chloride is used in the amount of 0.01 to 1.0 mole per mole of chloroform.

13. Process for the preparation of thionyl chloride which comprises reacting sulfur dioxide and a chlorinated methane of the formula $CH_{4-x}Cl_x$, where $x$ is three to four, in the presence of a Friedel-Crafts' catalyst and recovering the thionyl chloride.

14. Process for the preparation of thionyl chloride which comprises reacting sulfur dioxide and a chlorinated methane of the formula $CH_{4-x}Cl_x$, where $x$ is three to four, at 100° to 300° C. and a pressure of one to five hundred atmospheres in the presence of a Friedel-Crafts' catalyst and recovering the thionyl chloride.

15. Process for the preparation of thionyl chloride which comprises reacting sulfur dioxide and a chlorinated methane of the formula $CH_{4-x}Cl_x$, where $x$ is three to four, at 100° to 300° C. and a pressure of one to five hundred atmospheres in the presence of a Friedel-Crafts' metal halide catalyst and recovering the thionyl chloride.

ALBAN THOMAS HALLOWELL.
GORDON THEODORE VAALA.